United States Patent [19]
Aizawa et al.

[11] Patent Number: 6,036,582
[45] Date of Patent: Mar. 14, 2000

[54] POLISHING APPARATUS

[75] Inventors: Hideo Aizawa, Ayase; Kenya Ito, Fujisawa; Hiromi Yajima, Yokohama; Kenichi Shigeta, Tokyo; Yoshikuni Tateyama, Hiratsuka, all of Japan

[73] Assignees: Ebara Corporation, Tokyo; Kabushiki Kaisha Toshiba, Kawasaki, both of Japan

[21] Appl. No.: 09/092,046

[22] Filed: Jun. 5, 1998

[30] Foreign Application Priority Data

Jun. 6, 1997 [JP] Japan ................................ 9-165152
Jun. 6, 1997 [JP] Japan ................................ 9-165153

[51] Int. Cl.$^7$ ........................................................ B24B 1/00
[52] U.S. Cl. .......................... 451/41; 451/66; 451/67; 451/288
[58] Field of Search ........................ 451/41, 285–289, 451/451, 65, 66, 67

[56] References Cited

U.S. PATENT DOCUMENTS

| | | | |
|---|---|---|---|
| 5,653,623 | 8/1997 | Kimura et al. | 451/288 |
| 5,655,054 | 8/1997 | Oishi et al. | 451/288 |
| 5,679,059 | 10/1997 | Nishi et al. | 451/28 |
| 5,779,520 | 7/1998 | Hayakawa . | |
| 5,827,110 | 10/1998 | Yajima et al. | 451/288 |
| 5,830,045 | 11/1998 | Togawa et al. | 451/288 |
| 5,904,611 | 5/1999 | Takahashi et al. | 451/41 |

FOREIGN PATENT DOCUMENTS 9-117857  5/1997  Japan .

*Primary Examiner*—Robert A. Rose
*Assistant Examiner*—George Nguyen
*Attorney, Agent, or Firm*—Wenderoth, Lind & Ponack, L.L.P.

[57] ABSTRACT

A polishing apparatus for polishing semiconductor wafers has a space divided into a plurality of rooms cleaned to different degrees. A storage unit for storing semiconductor wafers is disposed in one of the rooms. A polishing unit for chemically and mechanically polishing a semiconductor wafer supplied from the storage unit is disposed in another one of the rooms. A delivery gate is disposed between the storage unit and the polishing unit and has a temporary storage chamber defined therein for temporarily storing a semiconductor wafer therein.

20 Claims, 7 Drawing Sheets

POLISHING APPARATUS

BACKGROUND OF THE INVENTION

1. Field of the Invention

The present invention relates to a polishing apparatus, and more particularly to a polishing apparatus for polishing a planar workpiece such as a semiconductor wafer to a flat mirror finish.

2. Description of the Prior Art

As semiconductor devices become finer and more highly integrated in recent years, circuit interconnections become thinner and the distances between those interconnections also become smaller. Photolithographic processes for producing circuits in integrated semiconductor devices of that type require a flat image-focusing plane for a stepper device because the depth of focus of the light beam is narrow. Therefore, it is necessary to planarize the s of semiconductor wafers. One proposal to planarize semiconductor wafers to a flat finish has been to use a chemical-mechanical polishing (CMP) apparatus for polishing a semiconductor wafer. The CMP apparatus polishes the semiconductor wafer by pressing the semiconductor wafer held by a carrier against an abrasive cloth while supplying an abrasive solution containing abrasive grain to the abrasive cloth which is attached to a rotating turntable.

One such CMP polishing unit comprises an abrasive table rotatable in a plane, and a carrier for pressing a surface of a workpiece to be polished against the abrasive table. To the polishing unit, there are added a storage device for storing workpieces, a cleaning device for cleaning the workpieces which have been polished by the polishing unit, a reversing device disposed adjacent to the storage device, and a delivery device for delivering workpieces between the storage device, the cleaning device, and the reversing device.

Figure 7:
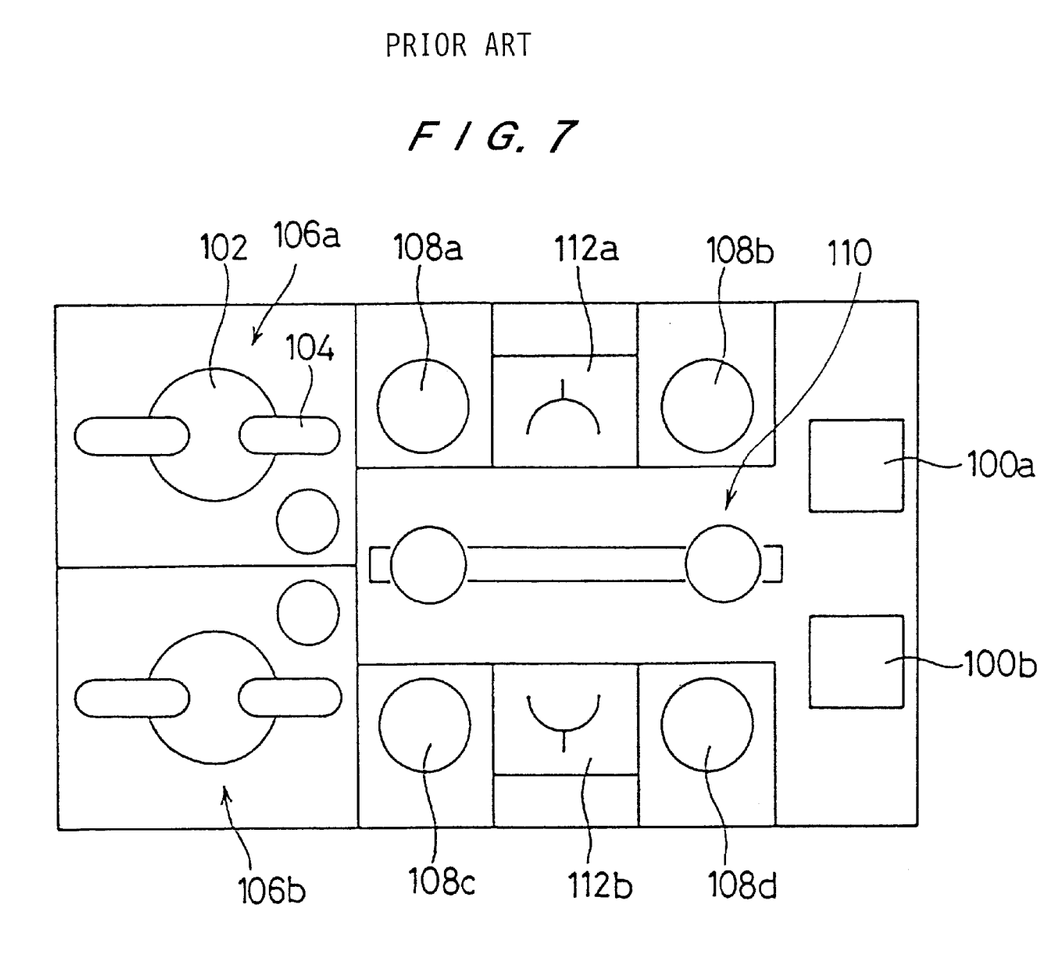
FIG. 7 is a schematic plan view of a conventional polishing apparatus.

FIG. 7 of the accompanying drawings shows a conventional CMP apparatus. As shown in FIG. 7, the conventional CMP apparatus comprises: a pair of storage devices 100a, 100b for storing workpieces; a pair of polishing units 106a, 106b each having a turntable 102 and a top ring 104; a plurality of cleaning devices 108a–108d for cleaning and drying the workpieces which have been polished by the polishing units 106a, 106b; a delivery device 110 for delivering workpieces between the storage devices 100a, 100b, the polishing units 106a, 106b, and the cleaning devices 108a–108d; and a pair of reversing devices 112a, 112b for reversing an orientation of each of the workpieces. The components of the polishing apparatus are arranged in a chamber defined by a frame in the form of a rectangular parallelepiped. The components are arranged in view of an overall flow of the processing operation and the direction in which workpieces are delivered. The components are enclosed by a single cover forming a chamber which is air-conditioned such that air flows downwardly in the chamber.

Since the polishing apparatus shown in FIG. 7 has two polishing units, it can be used to polish compound semiconductor wafers in multiple stages using different abrasive solutions while preventing compound semiconductor wafers from being contaminated by an abrasive solution used in a previous stage. Consequently, a reduction in the quality and yield of polished semiconductor wafers is avoided. If the polishing apparatus shown in FIG. 7 is used to polish semiconductor wafers in a single stage, then semiconductor wafers may be polished simultaneously by the two polishing units, thereby increasing throughput.

In the conventional polishing apparatus, the various components are accommodated in one chamber. Therefore, air may flow between a polishing process having a relatively low requirement for clean air and a final cleaning process having a relatively high requirements for clean air. For example, small particles which may comprise splashed abrasive solution and removed wafer material tend to flow from a polishing unit to a cleaning device, contaminating the cleaning device. Furthermore, because those semiconductor wafers which have been polished, cleaned, and dried are delivered to the storage devices 100a, 100b by the delivery device 110, when the delivery device 110 is contaminated, then the semiconductor wafers that are carried by the delivery device 110 are also contaminated. If the requirement for clean air in the chamber as a whole must be increased in order to avoid undesirable contamination, then the air-conditioning unit used needs to have an increased capability. This results in an increase in the cost of the facility and the operation cost. One solution would be to partition the various different processes into compartments. However, the partitioned processes could not easily be accessed by human operators so that it would become difficult to inspect and service the components in the compartments.

SUMMARY OF THE INVENTION

It is an object of the present invention to provide a polishing apparatus which is capable of preventing various different processes or components from being contaminated due to interactions therebetween so that highly clean products can be provided, while suppressing an increase in the cost of the facility and the operation cost.

Another object of the present invention is to provide a polishing apparatus which allows various components to be easily inspected and serviced for maintenance, while preventing various different processes or components from being contaminated due to interactions therebetween.

According to the present invention, a polishing apparatus includes an envelope for defining a space therein, and the space is compartmentalized into a plurality of rooms cleaned to different degrees. A storage unit is disposed in one of the rooms for storing at least one workpiece. A polishing unit is disposed in another one of the rooms for chemically and mechanically polishing a workpiece supplied from the storage unit. A delivery gate is disposed between the storage unit and the polishing unit, and the delivery gate has at least one temporary storage compartment defined therein for temporarily placing a workpiece therein.

With this arrangement, it is possible to keep the rooms highly clean, and to transfer workpieces smoothly between the rooms while maintaining a desired level of cleanness for final products. The rooms can be kept clean, for example, by generating respective pressures in the rooms which prevent air from flowing from less clean rooms into cleaner rooms. The pressures may be regulated by operating valves in ducts or by adjusting the revolution offins of air discharge units. The polishing apparatus may have reversing devices for reversing the orientation of workpieces so they are upside down, and may have cleaning devices which are combined with drying devices for drying polished workpieces so that dried workpieces will be returned to the storage unit.

The delivery gate may also have an air passage for supplying clean air to each of the temporary storage compartment. Air which is contaminated when the delivery gate is opened can be replaced with clean air so that a workpiece is prevented from being contaminated in the temporary storage compartment.

The delivery gate may have shutters independently operable to open and close the temporary storage compartment with respect to the exterior of the delivery gate. For transferring a workpiece between the delivery gate and one of the rooms, only the shutter disposed between the delivery gate and that one room is opened. Therefore, the workpiece can be transferred while preventing air from flowing through the delivery gate.

The delivery gate may have a plurality of the temporary storage compartments. A plurality of temporary storage compartments allows a plurality of workpieces to be transferred independently through the temporary storage compartments. Therefore, the workpieces can be transferred smoothly between the rooms through the delivery gate for an increased throughput. The temporary storage compartments are used independently depending on the degree of cleanness of the workpieces to be trans transferred erred therethrough. Consequently, the workpieces are prevented from being. contaminated by the temporary storage compartments.

The temporary storage compartments may be positioned one above the other, and clean air may be supplied downward through the air passage across the temporary storage compartments.

The first room may house a first processing unit for cleaning and drying a workpiece polished by the polishing unit.

The second room may house a second processing unit for buffing and cleaning a workpiece polished by the polishing unit. The second room may be divided into regions accommodating the polishing unit, the second transferring device, and the second processing unit, respectively. The temporary storage compartment may be defined in a delivery gate.

According to another aspect of the present invention, a polishing apparatus includes a first chamber housing a storage unit for storing at least one workpiece, and housing a first transferring device for delivering (transferring) a workpiece. The polishing apparatus also includes a second chamber housing a polishing unit for chemically and mechanically polishing a workpiece supplied from the storage unit, and housing a second transferring device for delivering (transferring) a workpiece. The polishing apparatus also includes a temporary storage compartment disposed between the first chamber and the second chamber for temporarily placing a workpiece therein.

According to still another aspect of the present invention, there is provided a method of manufacturing a semiconductor device in one space. The method comprises: taking out a semiconductor wafer having a semiconductor device on a surface thereof from a storage cassette and delivering the semiconductor wafer to a temporary storage compartment; delivering the semiconductor wafer from the temporary storage compartment to a polishing unit; chemically and mechanically polishing the semiconductor wafer with the polishing unit; delivering the polished semiconductor wafer to a buffing unit; buffing the semiconductor wafer with the buffing unit; delivering the buffed semiconductor wafer to a first cleaning device; cleaning the semiconductor wafer with the first cleaning device; delivering the cleaned semiconductor wafer to the temporary storage compartment; delivering the semiconductor wafer from the temporary storage compartment to a second cleaning device; cleaning and drying the semiconductor wafer with the second cleaning device; and delivering the dried semiconductor wafer to a storage cassette.

At least one of the steps may include the step of cleaning the semiconductor wafer in the space, and may be carried out in a clean room.

According to yet another aspect of the present invention, there is provided a polishing apparatus comprising an envelope for defining a space therein, and the space is compartmentalized into a plurality of chambers cleaned to different degrees. The polishing apparatus also comprises a polishing unit disposed in one of the chambers for chemically and mechanically polishing a workpiece, and a plurality of doors disposed in walls which define the chambers. In order to allow maintenance of various regions of the polishing apparatus, the doors may be opened for direct access to those regions.

The polishing apparatus may further comprise guide rails in at least one of the chambers for moving a device within the chambers or through the doors. When the device is moved along the guide rails within or out of the space, the operator can enter the region where the device was, and inspect and service various units and devices for maintenance.

The polishing apparatus may further comprise a storage unit disposed in another one of the chambers for storing at least one workpiece. The apparatus may also comprise a temporary storage compartment disposed between the storage unit and the polishing unit for temporarily storing a workpiece transferred between the storage unit and the polishing unit. The temporary storage compartment may be positioned on a transfer path for delivering a workpiece between chambers. When the temporary storage compartment is retracted out of the transfer path, it creates a path for the operator to access various devices and units for maintenance.

The polishing apparatus may further comprise a floor on which the guide rails are mounted and a floor plate covering the floor. The floor plate conceals wires, pipes, actuators, etc. to allow the operator to walk without catching and damaging those wires, pipes, and actuators. The polishing apparatus may further comprise a plurality of cleaning devices disposed one on each side of the device.

BRIEF DESCRIPTION OF THE DRAWINGS

The above and other objects, features, and advantages of the present invention will become apparent from the following description, when taken in conjunction with the accompanying drawings. The drawings illustrate a preferred embodiment of the present invention by way of example, and in which.

DETAILED DESCRIPTION OF THE PREFERRED EMBODIMENT

Figure 1:
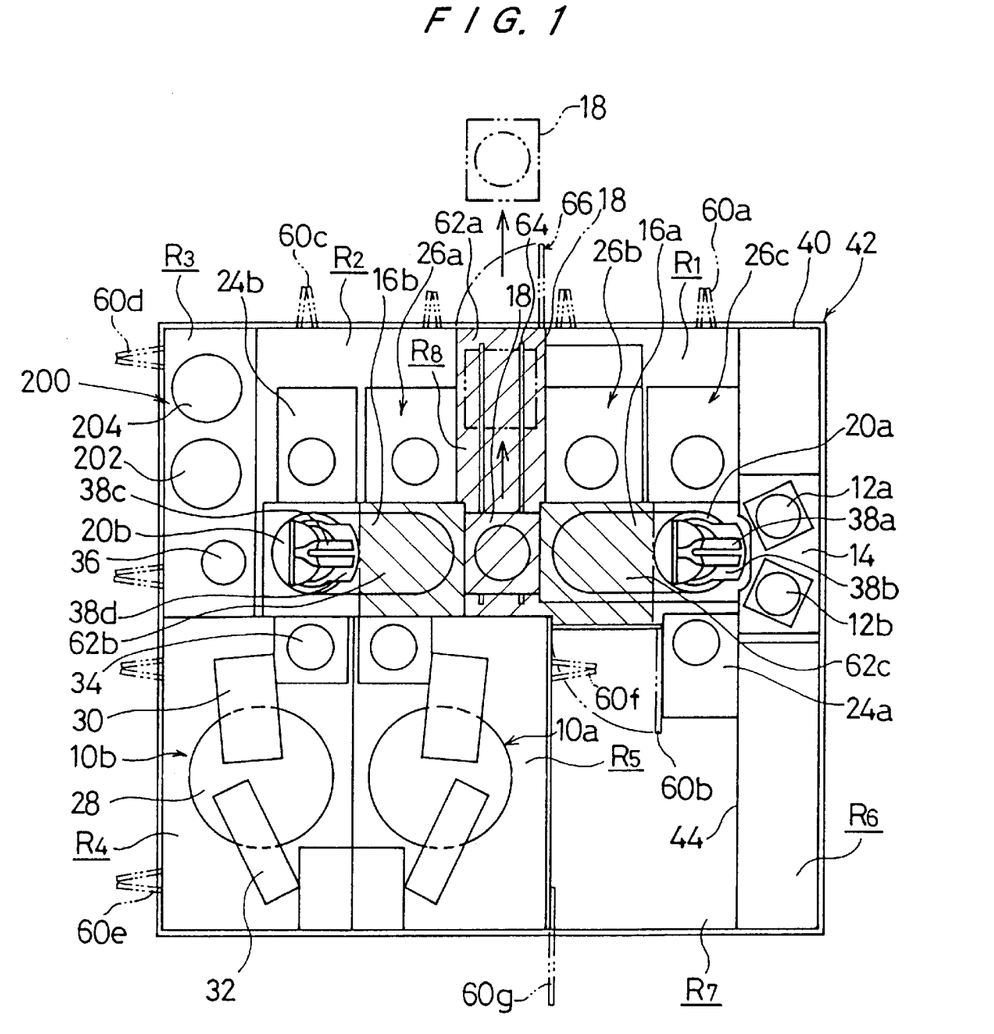
FIG. 1 is a schematic plan view of a polishing apparatus according to the present invention.
Figure 4:
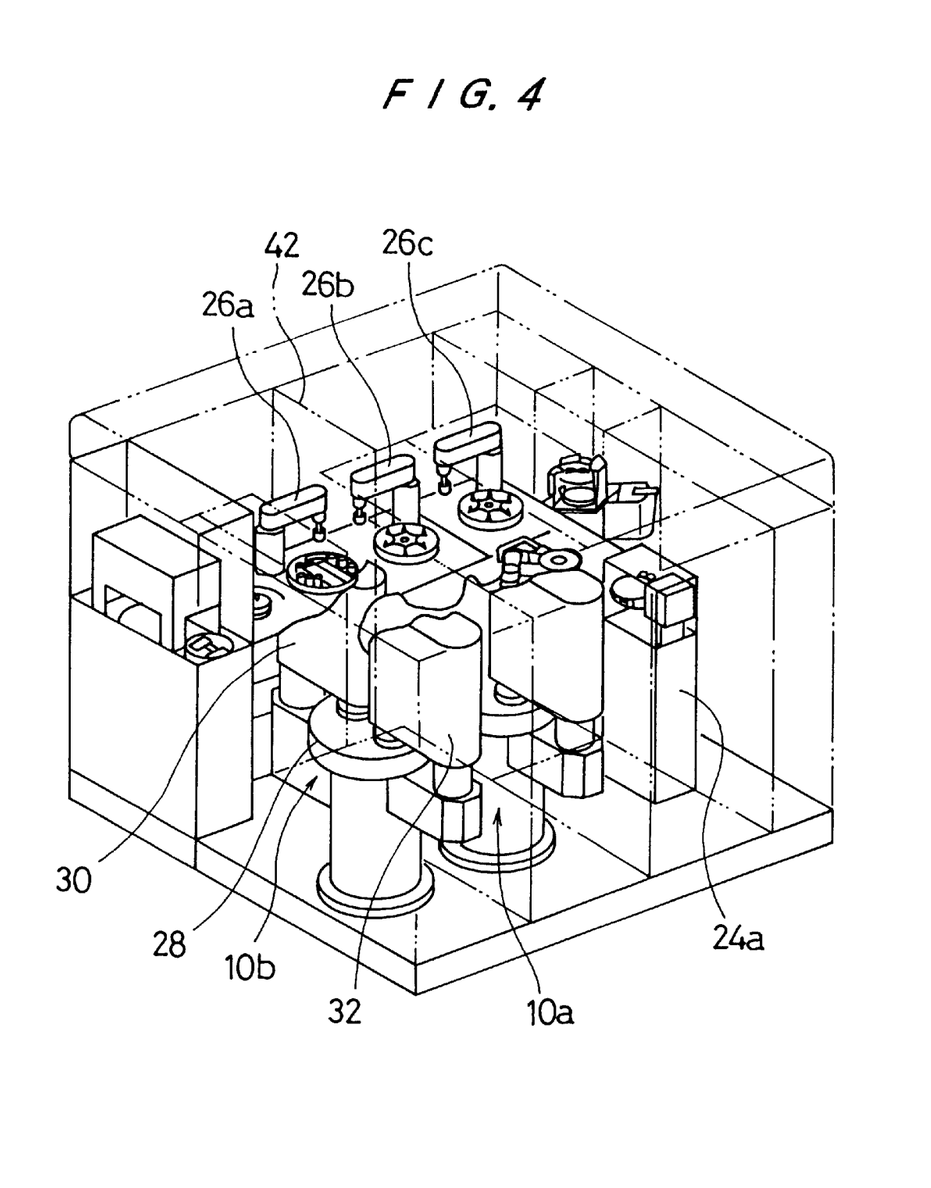
FIG. 4 is a perspective view of an internal structure of the polishing apparatus shown in FIG. 1.

As shown in the plan view of FIG. 1, a polishing apparatus according to the present invention has a pair of polishing units 10a, 10b placed on one side of an end of a space above an elongated rectangular floor. A loading/unloading unit 14 is disposed at the opposite end of the space and houses a pair of wafer storage cassettes 12a, 12b. Two rails 16a, 16b extend from the loading/unloading unit 14 toward the polishing units 10a, 10b and are positioned one on each side of a delivery gate 18. First and second transferring robots 20a, 20b are disposed on rails 16a, 16b, respectively. A buffing unit 200 is positioned at an end of the rail 16b, remotely located with regard to the loading/unloading unit 14. Two reversing devices 24a, 24b and three cleaning devices 26a, 26b, 26c are disposed along the sides of the rails 16a, 16b (see also FIGS. 2 and 4).

Figure 2:
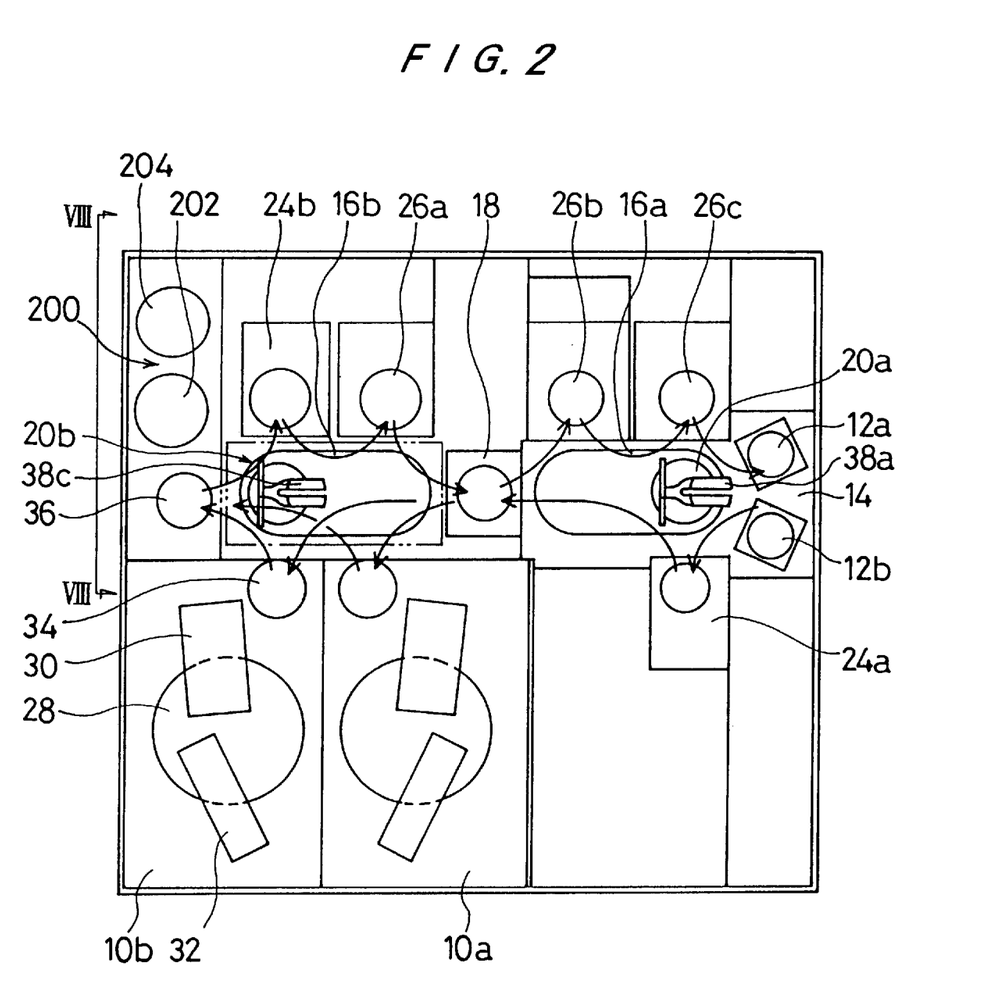
FIG. 2 is a schematic plan view showing a flow of semiconductor wafers in the polishing apparatus shown in FIG. 1.

As shown in FIG. 2, each of the polishing units 10a, 10b comprises a turntable 28 with an abrasive cloth attached to an upper surface thereof, a top ring (wafer carrier) 30 for holding a semiconductor wafer attracted under vacuum and for pressing the semiconductor wafer against the turntable 28, a dressing unit 32 for dressing the abrasive cloth, and a mechanism for supplying water or an abrasive solution containing abrasive grain to the turntable 28 and the dressing unit 32. The polishing units 10a, 10b also have respective pushers (transfer tables) 34 positioned near the rail 16b for transferring a semiconductor wafer to and from the top ring 30. The top ring 30 can be turned in a horizontal plane, and the pusher 34 is movable vertically.

Figure 6:
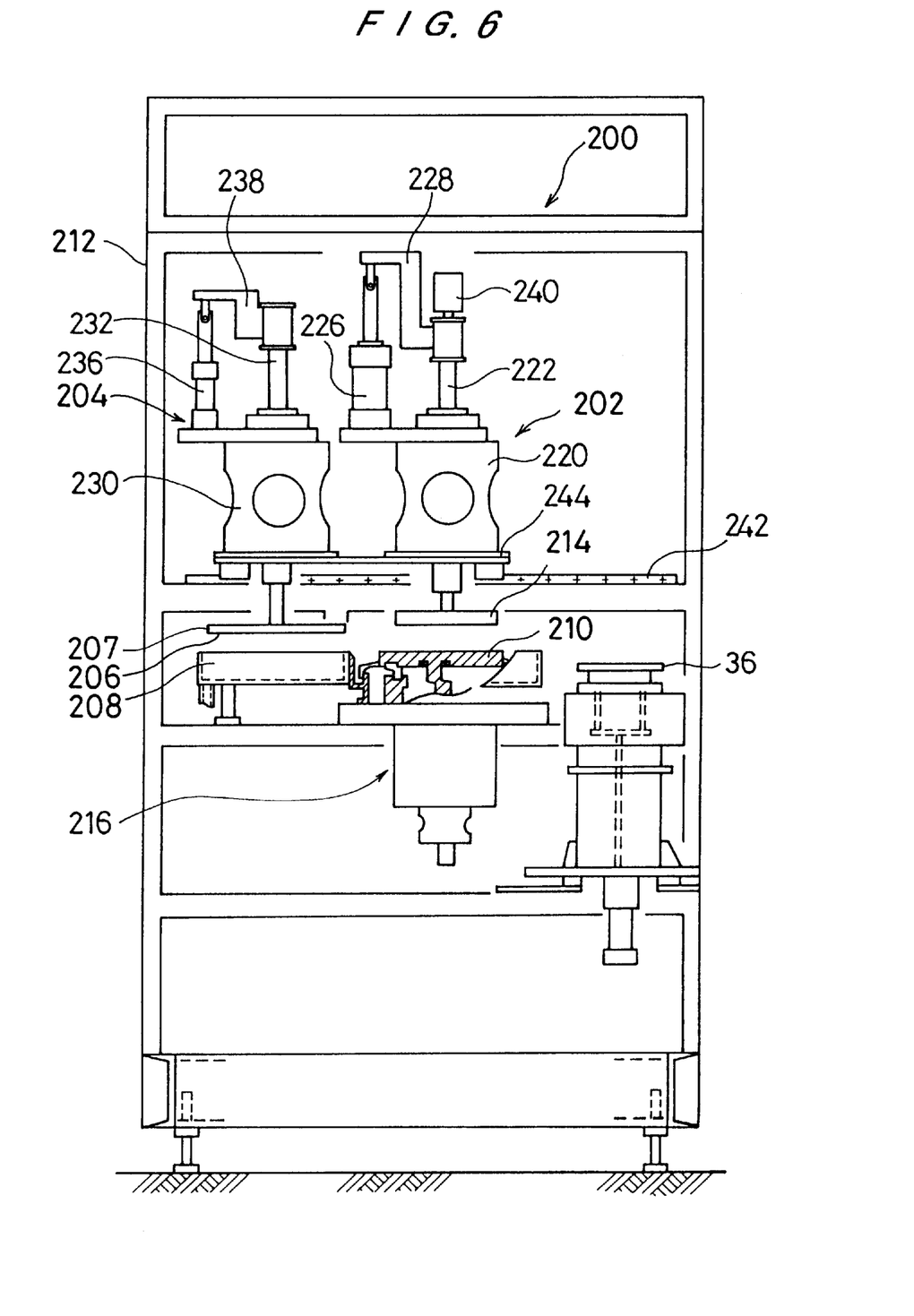
FIG. 6 is an enlarged elevational view taken along line VIII—VIII of FIG. 2.

The buffing unit 200 serves to finish or clean semiconductor wafers which have been polished by the polishing units 10a, 10b. As shown in FIGS. 2 and 6, the buffing unit 200 comprises a buffing member 216 having a table (buffing tool) 210 movable for circular transactional (orbital) motions with a buff attached thereto, a pusher 36 for transferring semiconductor wafers to and from the transferring robot 20b, a top ring head (wafer carrier) 202 for holding a semiconductor wafer transferred from the pusher 36 and for pressing the semiconductor wafer against the buffing tool 210, a dressing unit 204 having a dressing tool 206 (see FIG. 6) for dressing the buffing tool 210, and a rinsing tank 208 for rinsing the dressing tool 206.

As shown in FIG. 6, the buffing unit 200 is housed in a cover 212. The top ring head 202 and the dressing unit 204 are disposed in an upper portion of the cover 212, and the buffing member 216 and the pusher 36 are disposed in a lower portion of the cover 212. Here, the top ring head 202 is positioned above the table (buff tool) 210, and the dressing tool 206 is positioned above the rinsing tank 208.

The top ring head 202 has a vertical support shaft 222 extending through a cylindrical casing 220, and a top ring 214 mounted on a lower end of the support shaft 222 for holding a semiconductor wafer on its lower surface and pressing the semiconductor wafer against the buffing member 216 under given forces. An electric motor (not shown) is housed in the cylindrical casing 220 and is operatively connected to the support shaft 222. When the electric motor is energized, the support shaft 222 is rotated about its own axis. A cylinder 226 disposed laterally with respect to the cylindrical casing 220 is connected to the support shaft 222 by a joint 228. When the cylinder 226 is actuated, the support shaft 222 is moved vertically.

The dressing unit 204 has a vertical support shaft 232 extending through a cylindrical casing 230, and a dressing head 207 is mounted on a lower end of the support shaft 232 and supports the dressing tool 206 for dressing the buff attached to the table 210. An electric motor (not shown) is housed in the cylindrical casing 230 an and is operatively connected to the support shaft 232. When the electric motor is energized, the support shaft 232 is rotated about its own axis. A cylinder 236 disposed laterally with respect to the cylindrical casing 230 is connected to the support shaft 232 by a joint 238. When the cylinder 236 is actuated, the support shaft 232 is moved vertically.

Each of the support shafts 222, 232 comprises a spline shaft which is axially movably held in mesh with grooves on the output shaft of the electric motor. Therefore, the support shafts 222, 232 can be moved vertically by the respective cylinders 226, 236 while being operatively connected to the output shafts of the electric motors so as to be capable of vertical movement. An encoder 240 is mounted on the upper end of the support shaft 222 for detecting an angular displacement of the support shaft 222 and, hence, the top ring 214.

The top ring head 202 and the dressing unit 204 are mounted on a carriage 244 in the form of a flat rectangular plate that is movable along a pair of guide rails 242, with the top ring 214 and the dressing head 207 projecting downward from the carriage 244. When the carriage 244 moves along the guide rails 242, the top ring 214 can move reciprocally between an area above the buffing member 216 and an area above the pusher 36. In addition, the dressing head 207 can move reciprocally between an area above the cleaning tank 208 and an area above the buffing member 216.

The buff attached to the upper surface of the table 210 comprises an abrasive woven or nonwoven cloth or a wiping cloth of ultra-fine fibers. The pusher 36 serves to transfer semiconductor wafers between the top ring 214 and the transferring robot 20b. The pusher 36 is movable vertically and its position with respect to the transferring robot 20b (moving toward and away from the robot is adjustable).

The table (buffing tool) 210 is smaller in diameter than usual turntables rotating about their own axis. Therefore, the buffing unit 200 is relatively small in size and hence is a space saver in the polishing apparatus.

The cleaning devices 26a, 26b, 26c may be one of various types depending on their application. For example, each of the cleaning devices 26a, 26b, 26c may be in the form of a pencil having a body of sponge material mounted on its tip, or in the form of a roller having a body of sponge. Each of these forms is used for cleaning one or both surfaces of semiconductor wafers. Alternatively, the final cleaning device 26c may be a spinning type for spinning a semiconductor wafer to remove water and dry the semiconductor wafer.

Each of the transferring robots 20a, 20b is attached to a carriage movable on respective rails 16a, 16b, for example, and comprises two independent articulated arms mounted at an upper side thereof which are bendable in (can rotate within) a horizontal plane. A holding hand is mounted on the tip end of each of the articulated arms. These two hands are mounted to the arms at different heights so as not to interfere with each other when they are retracted as shown in FIG. 1. The upper holding hand of the first transferring robot 20a serves as a dry hand 38a for holding semiconductor wafers which are to be polished and semiconductor wafers which have been dried. The lower holding hand of the first transferring robot 20a serves as a wet hand 38b for semiconductor wafers which are to be dried. The upper holding hand of the second transferring robot 20b serves as a clean hand 38c for holding clean semiconductor wafers. The lower holding hand of the second transferring robot 20b serves as a dirty hand 38d for holding semiconductor wafers which are in a polishing process. These four hands 38a–38d are movable vertically for entry into an upper or lower space in the delivery gate 18. The wet hand 38b and the dirty hand 38d are abbreviated in FIG. 2.

The reversing devices 24a, 24b are needed because of the manner in which the wafers are housed in the cassettes 12a, 12b and also because of the holding mechanisms of the transferring robots 20a, 20b. However, the reversing devices 24a, 24b may be dispensed with if the semiconductor wafers are transferred with their surfaces to be polished or polished surfaces facing downward at all times. The reversing devices 24a, 24b may also be dispensed with if each of the transferring robots 20a, 20b has a reversing mechanism itself. In the illustrated embodiment, the reversing device 24a handles dry semiconductor devices to be polished and the reversing device 24b handles wet semiconductor devices that have been polished.

The polishing apparatus has a storage space 42 in the shape of rectangular parallelepiped surrounded by an outer wall 40 and divided into a plurality of first through fifth chambers R1–R5 by partitions 44. The loadinglunloading unit 14, the first transferring robot 20a, and the reversing device 24a and the two cleaning devices 26b, 26c which are disposed along both sides of the first transferring robot 20a are accommodated in the first chamber R1. The second transferring robot 20b, and the reversing device 24b and the cleaning device 26a which are disposed along one side of the second transferring robot 20b are accommodated in the second chamber R2. The buffing unit 200 is accommodated in the third chamber R3. The polishing units 10a, 10b are accommodated in the fourth and fifth chambers R4, R5, respectively.

The storage space 42 also has a sixth chamber R6 positioned adjacent to the loadingunloading unit 14 and which houses a controller (not shown). In addition, a seventh chamber R7 is positioned adjacent to the sixth chamber R6 and has an opening through which a human operator can enter into the seventh chamber R7 for maintenance activities. A partition between the fifth and seventh chambers R5, R7 and a partition between the first and seventh chambers R1, R7 serve to prevent air from flowing from the first land fifth chambers R1, R5 into the seventh chamber R7. Since the seventh chamber R7 communicates with a clean room around the polishing apparatus through its opening, it is necessary to keep the seventh chamber R7 highly clean. Since the third and fourth chambers R4, R5 which house the polishing units 10a, 10b are more highly contaminant than the other chambers of the polishing apparatus, it is important that the fourth and fifth if chambers R4, R5 be isolated from the first chamber R1, which also needs to be kept highly clean.

Figure 3:
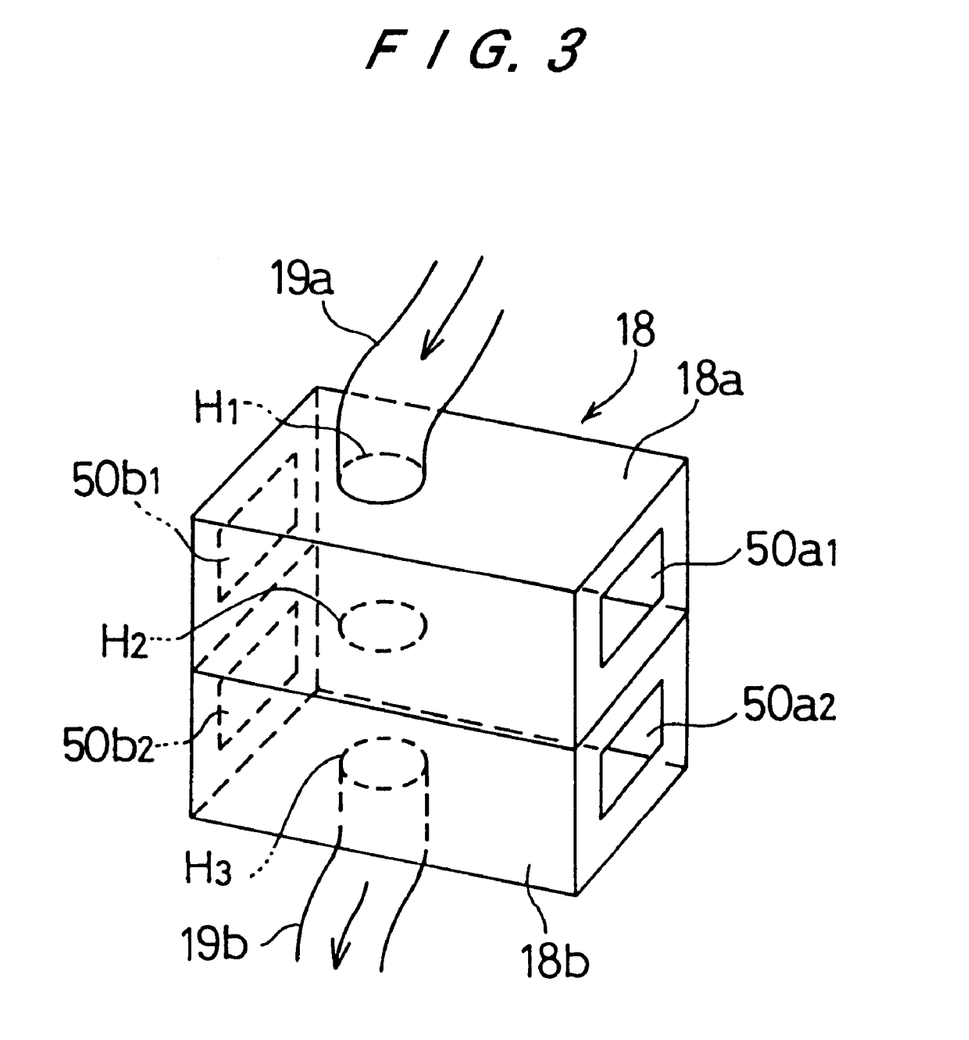
FIG. 3 is a perspective view of a delivery gate in the polishing apparatus shown in FIG. 1.

The delivery gate 18 for temporarily placing semiconductor wafers therein when they move between the first and second chambers R1, R2 is positioned between the first and second chambers R1, R2. The delivery gate 18 comprises a plastic box and serves to transfer semiconductor wafers between the first and second chambers R1, R2. As shown in FIG. 3, the delivery gate 18 has upper and lower temporary storage compartments 18a, 18b defined therein and vertically separated from each other. The upper temporary storage compartment 18a serves to transfer dry semiconductor wafers between the first and second chambers R1, R2, and the lower temporary storage compartment 18b serves to transfer wet semiconductor wafers between the first and second chambers R1, R2.

Shutters (not shown) are disposed in the partitions between the second chamber R2 and the third, fourth and fifth chambers R3, R4, R5 at positions facing the pushers 34, 36, respectively.

The delivery gate 18 also has a pair of shutters 50a1, 50b1 which are disposed in respective ends of the upper temporary storage compartment 18a and which face the first and second chambers R1, R2, respectively. The delivery gate 18 also includes a pair of shutters 50a2, 50b2 which are disposed in respective ends of the lower temporary storage compartment 18b and which face the first and second chambers R1, R2, respectively. These shutters 50a1, 50b1, 50a2, 50b2 are capable of opening and closing independently. The delivery gate 18 also has a hole H1 defined in an upper panel thereof, a hole H2 defined in an intermediate partition panel between the upper and lower temporary storage compartments 18a, 18b, and a hole H3 defined in a lower panel thereof The holes H1, H3 are connected respectively to inlet and outlet ducts 19a, 19b which supply clean air in a downward direction to the upper and lower temporary storage compartments 18a, 18b. A nozzle for applying water to semiconductor wafers is disposed in the lower temporary storage compartment 18b. Since clean air is supplied in a downward direction to the upper and lower temporary storage compartments 18a, 18b by the inlet and outlet ducts 19a, 19b, particles are prevented from being scattered in the upper and lower temporary storage compartments 18a, 18b, and the upper and lower temporary storage compartments 18a, 18b are prevented from contaminating each other. Since the lower temporary storage compartment 18b is used to transfer wet semiconductor wafers between the first and second chambers R1, R2, the upper temporary storage compartment 18a is prevented from being contaminated by wet semiconductor wafers in the lower temporary storage compartment 18b.

The upper and lower temporary storage compartments 18a, 18b which are divided in the delivery gate 18 offer various advantages. Firstly, they are effective to increase the throughput of the polishing apparatus. Specifically, if the delivery gate 18 had only one temporary storage compartment, and if an unpolished semiconductor wafer was placed in the delivery gate 18, a polished semiconductor wafer could not be introduced into the delivery gate 18. Instead, the polished semiconductor would need to wait in the cleaning device 26a until the unpolished semiconductor wafer had left the delivery gate 18. Consequently, semiconductor wafers would not flow smoothly through the delivery gate 18, but would have to wait for a certain period of time. Similarly, if a polished semiconductor wafer were placed in the delivery gate 18, an unpolished semiconductor wafer could not be introduced into the delivery gate 18. Instead, the unpolished semiconductor wafer would need to wait in the reversing device 24a until the polished semiconductor wafer had left the delivery gate 18. However, the upper and lower temporary storage compartments 18a, 18b in the delivery gate 18 allow semiconductor wafers to be transferred simultaneously between the first and second chambers R1, R2 without waiting for a certain period of time. Specifically, an unpolished semiconductor wafer can be transferred from the first chamber R1 to the second chamber R2 and a polished semiconductor wafer can be transferred from the second chamber R2 to the first chamber R1 at the same time through the delivery gate 18. Therefore, the polishing apparatus has a higher throughput.

Secondly, the upper and lower temporary storage compartments 18a, 18b are assigned to the delivery of clean semiconductor wafers and the delivery of unclean semiconductor wafers, respectively. Therefore, clean semiconductor wafers are prevent prevented from being contaminated by unclean semiconductor wafers while being delivered through the delivery gate 18. In this embodiment, a wet semiconductor wafer is placed in the lower temporary storage compartment 18b, and pure water is applied from the nozzle to the wet semiconductor wafer to prevent particles from being deposited on the wet semiconductor wafer. A support base for the wet semiconductor wafer in the lower temporary storage compartment 18b is therefore wet with water and contaminated by particles. A dry semiconductor wafer is placed in the upper temporary storage compartment 18a, and no water is applied to the dry semiconductor wafer. Consequently, a support base for the dry semiconductor wafer in the upper temporary storage compartment 18a is not wet with water. If the polishing apparatus encounters trouble for some reason while a dry semiconductor wafer is being housed in the upper temporary storage compartment 18a, it may be necessary to return the dry semiconductor wafer to the loading/unloading unit 14. At this time, because the dry semiconductor wafer in the upper temporary storage compartment 18a is not contaminated by the support base in the upper temporary storage compartment 18a, the dry semiconductor wafer can be returned in a clean state to the loading/unloading unit 14. If an unpolished semiconductor wafer were contaminated and returned to the loadinglunloading unit 14, then contaminants or particles would be dried on and attached to the unpolished semiconductor wafer. The contaminants would then cause damage to the semiconductor wafer when it is subsequently polished.

The upper temporary storage compartment 18a is used to transfer dry semiconductor wafers in order to avoid contamination of dry semiconductor wafers with water. Specifically, if the upper temporary storage compartment 18a was used to transfer wet semiconductor wafers and the lower temporary storage compartment 18b was used to transfer dry semiconductor wafers, then the dry hand carrying semiconductor wafers would enter the lower temporary storage compartment 18b and would tend to be contaminated with water falling from the upper temporary storage compartment 18a. This could possibly contaminate semiconductor wafers that are to be polished.

The shutters 50a1, 50b1 are disposed in the respective ends of the upper temporary storage compartment 18a, and the shutters 50a2, 50b2 are disposed in the respective ends of the lower temporary storage compartment 18b. When the dry hand 38a is to introduce a dry semiconductor wafer from the first chamber R1 into the upper temporary storage compartment 18a, only the shutter 50a1 is opened. After the dry semiconductor wafer is introduced into the upper temporary storage compartment 18a, the shutter 50a1 is closed and the shutter 50b1 is opened. The dry semiconductor wafer is then delivered from the upper temporary storage compartment 18a into the second chamber R2 by the dirty hand 38d. Accordingly, air if prevented from flowing between the first and second chambers R1, R2 through the delivery gate 18. More particularly, the clean space in the first chamber R1 is prevented from being contaminated.

Similarly, when the clean hand 38c is to introduce a wet semiconductor wafer which has been cleaned by the cleaning device 26a from the second chamber R2 into the lower temporary storage compartment 18b, only the shutter 50b2 is opened. After the wet semiconductor wafer is introduced into the lower temporary storage compartment 18b, the shutter 50b2 is closed and the shutter 50a2 is opened. The wet semiconductor wafer is delivered from the lower temporary storage compartment 18b into the first chamber R1 by the wet hand 38b. Accordingly, since only necessary shutters are opened at different times, air is prevented from flowing between the first and second chambers R1, R2 through the delivery gate 18.

After a semiconductor wafer is introduced into one of the temporary storage compartments through an open shutter, the shutter is closed. Before the other shutter is opened, clean air may be supplied from the inlet duct 19a for a predetermined period of time thereby to replace the air in the delivery gate 18. In this manner, semiconductor wafers are more effectively prevented from being contaminated in the delivery gate 18. By keeping the first chamber R1 clean, it is possible to keep the dry hand 38a, and any unpolished dry semiconductor wafers clean. It is also possible to keep clean any dry semiconductor wafers which have been polished, cleaned, and dried. The dry hand 38a, needs to be kept clean in order to deliver dry semiconductor wafers which have been dried.

The polishing apparatus has mechanisms for keeping the atmosphere in the respective chambers clean to respective levels. Specifically, the polishing apparatus has pressure regulating mechanisms for regulating the pressures P1, P2, P3, P4(=P5) in the respective chambers R1, R2, R3, R4, R5 to the relationship: P1>P2>P3>P4 such that the pressures P1, P2, P3, P4 are progressively lower as the chambers R1, R2, R3, R4, R5 are progressively less clean. Since these pressures are regulated in order to prevent contaminated air from flowing from the chambers R3, R4, R5 into the chambers R1, R2, the pressures R3, R4 may be equal to each other. The pressure-regulating mechanisms may comprise mechanisms for establishing output settings of air blowers or discharge units connected to the chambers or may comprise mechanisms for adjusting the openings of ducts connected to the chambers. If necessary, the controller may have a control device for controlling the pressure-regulating mechanisms based on output signals from pressure sensors which detect the pressures in the chambers. The pressure-regulating mechanisms thus serve to control air so that it flows successively from clean chambers to progressively less clean chambers.

Figure 5A:
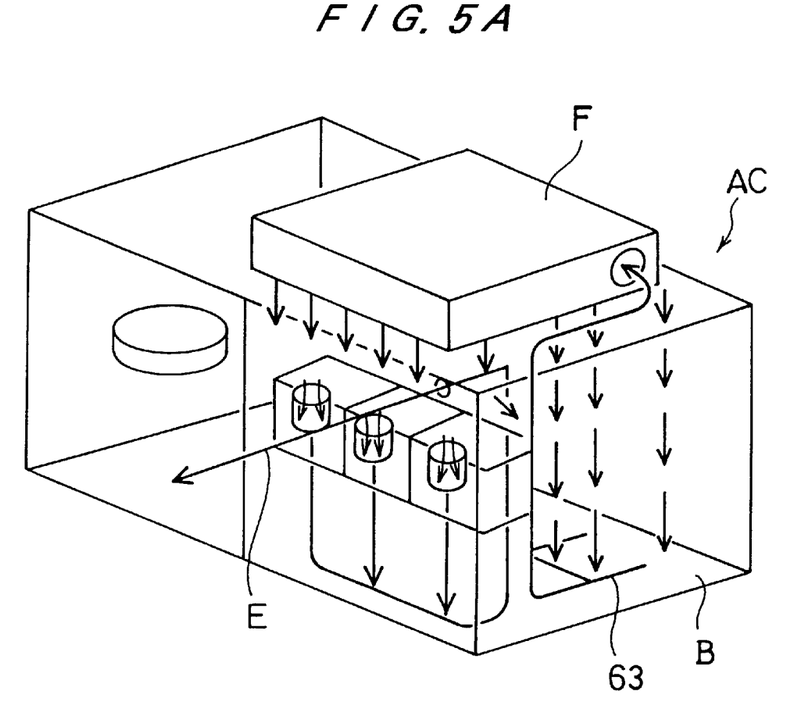
FIG. 5A is a schematic perspective view of an air-conditioning system of the polishing apparatus shown in FIG. 1.
Figure 5B:
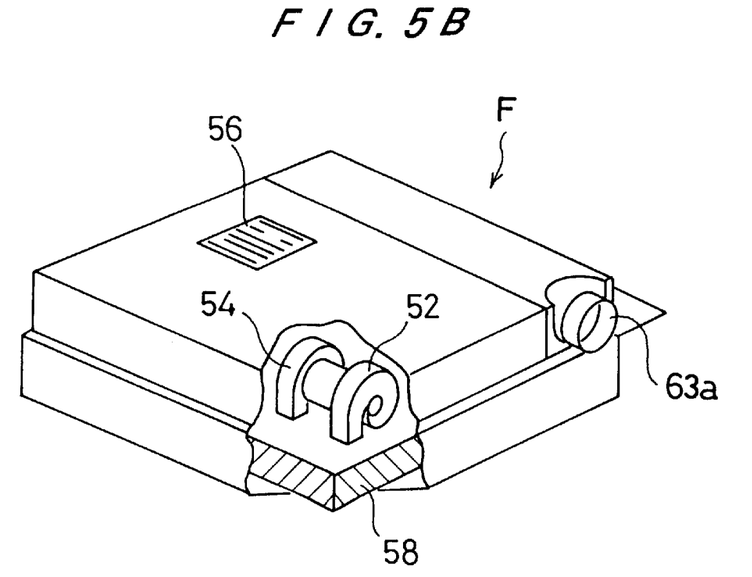
FIG. 5B is a fragmentary perspective view of a filter unit of the air-conditioning system shown in FIG. 5A.

Each of the first and second chambers R1, R2 incorporates a quasi closed loop type air-conditioning system AC (see FIG. 5A) for circulating part of the air in each of the chambers and producing a downward flow of air therein. The air-conditioning system AC includes a filter unit F positioned above the chamber. As shown in FIG. 5B, the filter unit F has a fan 54 driven by an inverter motor 52 for introducing ambient air from an air inlet 56, purifying the introduced air through a filter 58 above the chamber, and supplying the purified air into the chamber. The chamber has a circulation duct 63 disposed on the bottom thereof having an inlet opening positioned at a height so as not to draw cleaning water.

The filter unit F has an inlet port 63a communicating with an upstream side of the filter 58 and connected to the circulation duct 63. Air is circulated from the circulation duct 63 through the filter 58 into the chamber and then back to the circulation duct 63 by the fan 54. The air inlet 56 introduces air in an amount sufficiently large to make up for the air discharged together with drain water, from the cleaning devices 26a, 26b, 26c and the wet reversing device 24b. Air from the cleaning devices 26a, 26b, 26c and the reversing device 24b is exhausted through a floor B and then guided upwardly. Thereafter, the air is discharged from the chamber in the direction indicated by the arrow E, as shown in FIG. 5A. In this manner, the first and second chambers R1, R2 are kept highly clean.

The third, fourth, and fifth chambers R3, R4, R5 are not provided with an air cleaning or circulation system in the same manner as the first and second chambers R1, R2. However, air in these chambers is introduced from an upper region of each of those chambers and discharged from a lower region thereof to produce a downward air flow in each of those chambers. Therefore, contaminants and scattered liquids produced by actuators and mechanisms in the lower region of the chambers are prevented from being lifted up. In the third, fourth and fifth chambers R3, R4, R5, the downward air flow may be dispensed with because the air in the third, fourth and fifth if chambers R3, R4, R5 is not required to be highly clean. However, air is discharged from the lower region of each of the third, fourth and fifth chambers R3, R4, R5 in a similar manner as indicated by the arrow E in FIG. 5A, which develops a vacuum in these chambers R3, R4, R5 with respect to the outside space. When opening the doors for the maintenance of the devices, as will be described hereafter, it may be desirable to exhaust air from an upper side of the third, fourth and fifth chambers R3, R4, R5. This will prevent contaminated air from flowing out of chambers R3, R4, R5 into the clean room around the polishing apparatus.

The polishing apparatus also has a plurality of doors disposed in the wall for facilitating easy maintenance of the units and devices that are housed in the respective chambers. Specifically, a pair of foldable doors 60a is disposed in the outer wall 40 near the cleaning devices 26b, 26c in the first chamber R1 of space 42. A hinged swing door 60b is disposed in the partition 44 between the first chamber R1 and the maintenance chamber R7. A pair of foldable doors 60c are disposed in the outer wall 40 near the cleaning device 26a in the second chamber R2 of space 42. A pair of foldable doors 60d are disposed in the outer wall 40 of the third chamber R3 at an end of space 42. A pair of foldable doors 60e are disposed in the outer wall 40 of the fourth chamber R4 at the end of space 42. A foldable door 60f and a hinged swing door 60g are disposed in the partition 44 between the fifth chamber R5 and the maintenance chamber R7.

A temporary storage stage may be provided adjacent to the delivery gate for temporarily placing a workpiece thereon, and it is moveable within the space 42. In addition, the delivery gate 18 is movable in and out of the space 42 along a chamber R8 that is defined between the first chamber R1 and the second chamber R2. The delivery gate 18 can run on a pair of rails 64 disposed on a floor of the chamber R8, which is covered with a floor plate 62a. A hinged swing door 66 is disposed in the inlet of the chamber R8.

A flow of semiconductor wafers which are polished by the polishing apparatus will be described below. The dry hand 38a of the first transferring robot 20a picks up a semiconductor wafer from one of the wafer storage cassettes 12a, 12b of the loading/unloading unit 14. The semiconductor wafer is reversed (turned over) by the first reversing device 24a. After the shutter 50a1 of the delivery gate 18 is opened, the reversed semiconductor wafer is placed in the upper temporary storage compartment 18a by the dry hand 38a. Then, the shutter 50b1 of the delivery gate 18 is opened, and the semiconductor wafer is removed from the upper temporary storage compartment 18a by the dirty hand 38d of the second transferring robot 20b. Then, the shutter in the partition is opened, and the removed semiconductor wafer is placed on the pusher 34 of the polishing unit 10a or 10b.

If semiconductor wafers are processed in parallel, i.e., concurrently at both polishing units 10a, 10b, then they are delivered from the polishing units 10a, 10b to the buffing unit 200, to the reversing device 24b and to the cleaning device 26a. If semiconductor wafers are processed in series, they are delivered from the first polishing unit 10a to the cleaning device 26a, to the second polishing unit 10b, to the buffing unit 200, to the reversing device 24b and to the cleaning device 26a. The semiconductor wafers are delivered between these units and devices by the dirty hand 38d.

A relatively clean and wet semiconductor wafer which has been reversed by the reversing 24b and cleaned by the first cleaning device 26a is picked up by the clean hand 38c of the second transferring robot 20b. The shutter 50b2 is opened, and the semiconductor wafer is placed in the lower temporary storage compartment 18b by the clean hand 38c, after which the shutter 50b2 is closed. Since the clean hand 38c is used only for delivering the polished wet semiconductor wafer from the cleaning device 26a to the delivery gate 18, the clean hand 38c is kept clean and does not contaminate the semiconductor wafer.

In this embodiment, the two polishing units 10a, 10b are provided in combination with the single buffing unit 200. This is because the polishing process carried out by each of the polishing devices 10a, 10b takes a longer time than the buffing process carried out by the buffing unit 200. In a conventional polishing apparatus there is only one primary polishing unit in combination with a secondary polishing unit (buffing unit). Consequently, the secondary polishing unit has to wait until the polishing of a semiconductor wafer with the primary polishing unit is finished. According to this embodiment, however, since two primly polishing units, i.e., the polishing units 10a, 10b, are employed, semiconductor wafers can be polished concurrently by the polishing units 10a, 10b, and then buffed by the buffing unit 200. Since the buffing unit 200 does not have to idle in operation, the throughput of the polishing apparatus is high.

Then, the shutter 50a2 of the delivery gate 18 is opened, and the semiconductor wafer is removed from the lower temporary storage compartment 18b by the wet hand 38b of the first transferring robot 20a. The semiconductor wafer is then delivered successively to the second cleaning device 26b and the third cleaning device 26c for cleaning and drying. The semiconductor wafer dried by the third cleaning device 26c is removed by the dry hand 38a of the first transferring robot 20a, and returned to one of the wafer storage cassettes 12a, 12b of the loadinglunloading unit 14.

During the above operation of the polishing apparatus each of the chambers is basically isolated from the others and no air flows between the chambers except through the passages for delivering semiconductor wafers. Specifically, semiconductor wafers are transferred between the first chamber R1 and the second chamber R2 through the delivery gate 18. However, only the minimum number of shutters of the delivery gate 18 are opened at different times, and no air flows directly between the first chamber R1 and the second chamber R2. There are also shutters provided between the second chamber R2 and the third, fourth and fifth chambers R3, R4, R5, and these shutters are opened only when necessary. Even if there are gaps or clearances between the partitions, or even when the shutters are opened, air flows lows only from higher-pressure chambers into lower-pressure chambers. Accordingly, no air flows from less clean chambers into cleaner chambers, so that the cleaner chambers will not be contaminated by the less clean chambers.

In the above operation, it is necessary to keep the first chamber R1, the dry hand 38a, unpolished dry semiconductor wafers, and polished dry semiconductor wafers clean. Unpolished dry semiconductor wafers need to be kept clean because if they were polished with particles attached thereto, the particles would tend to cause damage to the semiconductor wafers.

It is especially necessary to keep the polished dry semiconductor wafers clean, and this is conducted by the following wing schemes.

(1) The dry hand 38a is kept clean for handling semiconductor wafer wafers that have been polished, cleaned, and dried.

(2) In order to keep the first chamber R1 clean, air is circulated through the delivery gate 18 and only the four shutters of the delivery gate 18 are selectively opened to prevent the first chamber R1 from being contaminated by air from the second chamber R2.

(3) In order to keep the first chamber R1 clean, air is circulated in and discharged from the first chamber R1.

(4) In order to keep the dry hand 38a clean, air is delivered from the hole H1 to the hole H2.

(5) In order to keep unpolished dry semiconductor wafers clean, air is delivered from the hole H1 to the hole H2.

(6) In order to keep polished dry semiconductor wafers clean, the dry hand 38a is kept clean, and the first chamber R1 is kept clean.

A maintenance process for the polishing apparatus will be described below. As described above, the doors 60a–60g are provided in respective regions of the chambers for maintenance. For example, for effecting maintenance work on the buffing unit 200 and the dressing unit 204 in the third chamber R3, the doors 60d in the otter wall 40 of the third chamber R3 at the end of the space 42 are opened. For effecting maintenance work on the polishing unit 10a in the fifth chamber R5, the doors 60f, 60g in the partition 44 between the fifth and seventh chambers R5, R7 are opened. Since the door 60f is located close to an inner region of the polishing unit 10a, the inner region of the polishing unit 10a can easily be inspected and serviced.

For inspecting and servicing parts that are located more inwardly, the door 66 is opened, and the delivery gate 18 and temporary storage compartment are moved through and out of the space 42 by rails 64. Thereafter, the door 60b is opened for the operator to enter the region where the delivery gate 18 was, and the transferring robot 20b in particular can be inspected and serviced. After the delivery gate 18 is removed from the polishing apparatus, a floor plate 62a is provided to cover cables and rails so that the operator can walk thereon without being caught or hung by those rails and cables. Therefore, the operator can smoothly and safely inspect and service the desired parts. Before the delivery gate 18 is moved, the inlet and outlet ducts 19a, 19b are removed from the delivery gate 18.

With the delivery gate 18 thus removed from the polishing apparatus, the operator or operator's hands can reach the region (shown hatched in FIG. 1) adjacent to the pushers 34 of the polishing units 10a, 10b, so that the operator can inspect and service relatively complex parts. Floor plates 62b, 62c are provided to extend from the floor plate 62a to positions midway along the paths of the transferring robots 20a, 20b. The floor plates 62a, 62b cover a ball screw system for driving the transferring robots 20a, 20b so as to prevent the operator from stepping on the ball screw system.

The transferring robot 20a has two hands 38a, 38b, and the transferring robot 20b has the two hands 38c, 38d. Since these hands 38a–38d are exclusively assigned for handling semiconductor wafers that at are cleaned, unclean, dried, and wet respectively, the semiconductor wafers are prevented from being contaminated by the hands 38a–38d. Furthermore, different semiconductor wafers are prevented from being contaminated through the delivery gate 18 because they are delivered through the upper and lower temporary storage compartments 18a, 18b, respectively, of the delivery gate 18.

The units and devices of the polishing apparatus embodied in this invention are not limited to those described above and may be of any arbitrary arrangement, number, type, or layout. For example, if semiconductor wafers are not processed in series or simultaneously, only one polishing unit is sufficient and less accessory equipment may be necessary. The reversing units may also be of any arbitrary arrangement, number, type, or layout, and the pushers 34, 36 are optional. The transferring robots 20a, 20b may be rigidly installed, rather than movable on the rails.

In the above embodiment, the first chamber R1 includes the loading/unloading unit 14. Since, however, the loading/unloading unit 14 needs to be kept particularly clean, the loading/unloading unit 14 may be disposed in a separate chamber surrounded by a partition. The loading/unloading unit 14 may be made higher in pressure than the space housing the cleaning devices 26b, 26c and the first transferring robot 20a, i.e., the space in the first chamber R1 from which the loading/unloading unit 14 is precluded. In addition, a shutter for transferring semiconductor wafers between the loading/unloading unit 14 and the transferring robot 20a may be disposed in the partition. With this modification, since the loading/unloading unit 14 is higher in pressure than the space housing the cleaning devices 26b, 26c and the first transferring robot 20a, the loading/unloading unit nit 14 is kept clean.

Although a certain preferred embodiment of the present invention has been shown and described in detail, it should be understood that various changes and modifications may be made therein without departing from the scope of the appended claims.

What is claimed is:

1. A polishing apparatus comprising:
an envelope forming a space therein, said space being divided into a plurality of rooms having different degrees of cleanliness, said plurality of rooms including a first room and a second room;
a storage unit for storing at least one workpiece, said storage unit being located in said first room;
a polishing unit for chemically and mechanically polishing a workpiece from said storage unit, said polishing unit being located in said second room; and
a delivery gate between said storage unit and said polishing unit, said delivery gate having a plurality of temporary storage compartments for temporarily storing a workpiece therein.

2. The apparatus of claim 1, wherein said plurality of temporary storage compartments are arranged vertically.

3. The apparatus of claim 2, wherein said plurality of temporary storage compartments includes a lowest temporary storage compartment for temporarily storing a wet workpiece, and an uppermost temporary storage compartment for temporarily storing a dry workpiece.

4. The apparatus of claim 1, wherein said delivery gate includes an air passage for replacing ambient air in said plurality of temporary storage compartments.

5. The apparatus of claim 1, further comprising a first transferring device for delivering a workpiece and a second transferring device for delivering a workpiece, wherein said first transferring device is housed in said first room and said second transferring device is housed in said second room.

6. The apparatus of claim 5, further comprising a first processing unit for cleaning and drying a workpiece polished by said polishing unit, wherein said first processing unit is housed in said first room.

7. The apparatus of claim 5, further comprising a second processing unit for buffing and cleaning a workpiece polished by said polishing unit, wherein said second processing unit is housed in said second room.

8. The apparatus of claim 7, wherein said second room is divided into regions, including a first region accommodating said polishing unit, a second region accommodating said second transferring device, and a third region accommodating said second processing unit.

9. A polishing apparatus comprising:
a first chamber housing a storage unit for storing at least one workpiece, and a first transferring device for delivering a workpiece;
a second chamber housing a polishing unit for chemically and mechanically polishing a workpiece delivered from said storage unit, and a second transferring device for delivering a workpiece; and
a plurality of temporary storage compartments between said first chamber and said second chamber, each of said plurality of temporary storage compartments being capable of temporarily storing a workpiece.

10. The apparatus of claim 9, wherein each of said temporary storage compartments has shutters for closing each of said temporary storage compartments from said first chamber and said second chamber.

11. The apparatus of claim 9, wherein said plurality of temporary storage compartments are arranged vertically.

12. A method of manufacturing a semiconductor device, comprising:
delivering a semiconductor wafer having a surface with a semiconductor device thereon from a storage unit to a temporary storage compartment;
delivering the semiconductor wafer from the temporary storage compartment to a polishing unit;
polishing the semiconductor wafer by a chemical and mechanical polishing process using the polishing unit;
delivering the polished semiconductor wafer to a buffing unit;
buffing the polished semiconductor wafer using the buffing unit;
delivering the buffed semiconductor wafer to a first cleaning device;
cleaning the buffed semiconductor wafer with the first cleaning device;
delivering the cleaned semiconductor wafer to the temporary storage compartment;
delivering the cleaned semiconductor wafer from the temporary storage compartment to a second cleaning device;
cleaning and drying the semiconductor wafer using the second cleaning device; and
delivering the dried semiconductor wafer to the storage unit.

13. The method of claim 12, wherein said method is conducted in a plurality of rooms including a first room and a second room, said cleaning and drying of the semiconductor wafer being conducted in the first room and said cleaning of the buffed semiconductor wafer being conducted in the second room.

14. The method of claim 13, wherein at least one of said rooms comprises a clean room.

15. The method of claim 13, wherein the temporary storage compartment constitutes a portion of a delivery gate, and wherein the delivery gate includes a plurality of temporary storage compartments, said delivering of the semiconductor wafer from the storage unit to the temporary storage compartment comprises delivering the semiconductor wafer to a dry workpiece temporary storage compartment of said delivery gate, and said delivering of the cleaned semiconductor wafer to the temporary storage compartment comprises delivering the cleaned semiconductor wafer to a wet workpiece temporary storage compartment.

16. A polishing apparatus comprising:
an envelope forming a space therein and having walls dividing said space into a plurality of rooms having different degrees of cleanliness, said walls having a plurality of doors, said plurality of rooms including a first room and a second room neighboring each other;
a polishing unit for chemically and mechanically polishing a workpiece, said polishing unit being located in one of said rooms;
a temporary storage compartment between said first room and said second room; and
guide rails in at least one of said rooms for moving said temporary storage compartment within said envelope or through said doors.

17. The apparatus of claim 16, further comprising a storage unit for storing at least one workpiece, said storage unit being located in said first room, said polishing unit being located in said second room, said temporary storage compartment being adapted for temporarily storing a workpiece to be transferred between said storage unit and said polishing unit.

18. The apparatus of claim 16, further comprising a floor having guide rails mounted thereon, and a floor plate covering said floor.

19. The apparatus of claim 16, further comprising a plurality of cleaning units, wherein said temporary storage compartment has a first end and a second end opposite said first end, and wherein at least one cleaning unit is located at said first end and at least one cleaning unit is located at said second end.

20. A polishing apparatus comprising:
an envelope forming a space therein, said space being divided into a plurality of rooms having different degrees of cleanliness, said plurality of rooms including a first room and a second room;
a storage unit for storing at least one workpiece, said storage unit being located in said first room;
a polishing unit for chemically and mechanically polishing a workpiece from said storage unit, said polishing unit being located in said second room;
a delivery gate between said storage unit and said polishing unit; and
a temporary storage stage adjacent to said delivery gate for temporarily storing a workpiece thereon, said temporary storage stage being movable within said envelope.

* * * * *